(12) United States Patent
Webb et al.

(10) Patent No.: US 8,424,179 B2
(45) Date of Patent: Apr. 23, 2013

(54) INSERTION AND RELEASE TOOL FOR PIPE FITTING ARRANGEMENT AND METHOD USING SUCH TOOL

(75) Inventors: Steven Paul Webb, Tipton (GB); Alan Richard Glaze, Marlbrook (GB)

(73) Assignee: Conex Universal Limited, Tipton (GB)

( * ) Notice: Subject to any disclaimer, the term of this patent is extended or adjusted under 35 U.S.C. 154(b) by 936 days.

(21) Appl. No.: 12/525,527

(22) PCT Filed: Jan. 31, 2008

(86) PCT No.: PCT/EP2008/000759
§ 371 (c)(1),
(2), (4) Date: Jul. 31, 2009

(87) PCT Pub. No.: WO2008/092682
PCT Pub. Date: Aug. 7, 2008

(65) Prior Publication Data
US 2010/0088869 A1  Apr. 15, 2010

(30) Foreign Application Priority Data
Feb. 1, 2007 (EP) .................................. 07002188

(51) Int. Cl.
*B23P 19/04* (2006.01)
*F16L 21/02* (2006.01)
*F16L 19/06* (2006.01)
*F16L 19/08* (2006.01)
*F16L 21/00* (2006.01)
*B25B 7/12* (2006.01)
*B21F 15/00* (2006.01)

(52) U.S. Cl.
USPC ............ 29/237; 285/374; 285/340; 285/237; 72/409.12; 72/409.14

(58) Field of Classification Search .................... 29/273; 285/374, 340, 319, 104, 321, 237; 72/409.12, 72/409.14, 452.8
See application file for complete search history.

(56) References Cited

U.S. PATENT DOCUMENTS

| | | | |
|---|---|---|---|
| 4,586,734 A | 5/1986 | Grenier | |
| 4,613,172 A | 9/1986 | Schattmaier | |

(Continued)

FOREIGN PATENT DOCUMENTS

| | | |
|---|---|---|
| DE | 3202367 A1 | 10/1982 |
| DE | 33 22 202 A1 | 1/1984 |

(Continued)

OTHER PUBLICATIONS

International Search Report mailed Jun. 20, 2008, in corresponding International Application No. PCT/EP2008/000759, filed Jan. 31, 2008, 3 pages.

(Continued)

Primary Examiner — Lee D Wilson
Assistant Examiner — Alvin Grant
(74) Attorney, Agent, or Firm — Christensen O'Connor Johnson Kindness PLLC

(57) ABSTRACT

A tool (20) for a pipe fitting arrangement in which a pipe is retainable arranged within a housing (1) by teeth (13) of a grip ring (12) placed within the housing, the tool comprising: first engagement means for engaging the pipe, said first engagement means having at least one part (12) adapted to enter the housing around the pipe in order to force the teeth of the grip ring out of engagement with the pipe, second engagement means for engaging the first engagement means as well as the housing in order to locate the housing relative to the tool, and a handle connected or connectable with the second engagement means. The first engagement means being connected to the second engagement means via at least one first joint being in form of a pivot (24f) and/or at least one first spring means (38) in order to be at least partly displaceable relative to the second engagement means, and a method using such a tool.

35 Claims, 10 Drawing Sheets

U.S. PATENT DOCUMENTS

| | | | |
|---|---|---|---|
| 5,120,153 A | | 6/1992 | Valls |
| 5,273,588 A | * | 12/1993 | Foster et al. .............. 118/723 E |
| 5,292,157 A | | 3/1994 | Rubichon |
| 5,356,476 A | * | 10/1994 | Foster et al. .................. 118/725 |
| 5,458,379 A | | 10/1995 | Hamada |
| 5,484,011 A | * | 1/1996 | Tepman et al. ............. 165/80.2 |
| 5,518,276 A | | 5/1996 | Gunderson |
| 5,540,821 A | * | 7/1996 | Tepman .................. 204/192.13 |
| 5,570,910 A | | 11/1996 | Highlen |
| 5,683,518 A | * | 11/1997 | Moore et al. .................. 118/730 |
| 5,695,224 A | | 12/1997 | Grenier |
| 5,722,702 A | | 3/1998 | Washburn |
| 5,792,990 A | | 8/1998 | Piero |
| 5,830,277 A | * | 11/1998 | Johnsgard et al. ............ 118/725 |
| 5,971,445 A | | 10/1999 | Norkey |
| 6,093,252 A | * | 7/2000 | Wengert et al. ............... 118/719 |
| 6,133,550 A | * | 10/2000 | Griffiths et al. ................ 219/403 |
| 6,200,634 B1 | * | 3/2001 | Johnsgard et al. ......... 427/248.1 |
| 6,296,711 B1 | * | 10/2001 | Loan et al. .................... 118/726 |
| 6,355,909 B1 | * | 3/2002 | Griffiths et al. ............... 219/403 |
| 6,454,865 B1 | * | 9/2002 | Goodman et al. ............ 118/728 |
| 6,608,287 B2 | * | 8/2003 | Halpin et al. ................. 219/390 |
| 6,630,991 B2 | * | 10/2003 | Kitamura et al. ............... 356/43 |
| D483,441 S | | 12/2003 | Dole |
| 6,783,161 B2 | | 8/2004 | Halama |
| 6,788,991 B2 | * | 9/2004 | De Haas et al. ............... 700/121 |
| 6,818,864 B2 | * | 11/2004 | Ptak ............................. 219/390 |
| 6,913,292 B2 | | 7/2005 | Snyder, Sr. |
| D524,427 S | | 7/2006 | Wilk, Jr. |
| 7,173,216 B2 | * | 2/2007 | Ptak ............................. 219/390 |
| 8,087,652 B2 | * | 1/2012 | Son ............................... 269/266 |
| 2002/0185868 A1 | | 12/2002 | Snyder, Sr. |
| 2003/0067170 A1 | | 4/2003 | Snyder, Sr. |
| 2006/0053608 A1 | | 3/2006 | Wu |
| 2006/0125236 A1 | | 6/2006 | Cuvo |

FOREIGN PATENT DOCUMENTS

| | | |
|---|---|---|
| DE | 3232367 A1 | 3/1984 |
| DE | 20 2005 001 100 U1 | 4/2005 |
| DE | 20 2005 008 125 U1 | 11/2006 |
| EP | 0 737 832 A1 | 10/1996 |
| EP | 1 521 027 B1 | 3/2006 |
| GB | 2249367 A | 5/1992 |
| GB | 2336638 A | 10/1999 |
| GB | 2390882 A | 1/2004 |
| JP | 05346191 A | 12/1993 |
| NL | 8204763 | 7/1984 |
| WO | 99/43978 A1 | 9/1999 |
| WO | 2005/114031 A2 | 12/2005 |

OTHER PUBLICATIONS

English translation of the German word "dichtung," <http://www.eudict.com/?lang=gereng?work=dichtung> [retrieved Sep. 3, 2009], 2 pages.

Office Action mailed Apr. 1, 2009, in U.S. Appl. No. 11/561,838, filed Nov. 20, 2006, 25 pages.

Final Office Action mailed Sep. 8, 2009, in U.S. Appl. No. 11/561,838, filed Nov. 20, 2006, 35 pages.

* cited by examiner

INSERTION AND RELEASE TOOL FOR PIPE FITTING ARRANGEMENT AND METHOD USING SUCH TOOL

The present invention refers to an insertion and release tool for a pipe fitting arrangement and a method for using such a tool.

A pipe fitting arrangement is known in particular from WO 2005/114031 A2 and will be discussed in further detail with respect to the enclosed FIG. 1a. Accordingly, a pipe fitting arrangement comprises a housing 100 into which a pipe, not shown, is to be inserted. The housing 100 is provided with a first shoulder 102, having a chamfer 103, a projection 104 defining a second and third shoulder, both being provided with a chamfer 105a, 105b, and a fourth shoulder 106 next to a rolled-over end 108. Between the first shoulder 102 and the projection 104 a sealing ring 110 and between the projection 104 and the rolled-over end 108 a grip ring 112 with internal teeth 114 is provided. Thus, the projection 104 fulfills a plurality of functions, namely by providing a spacer between the sealing ring 110 and the gripping ring 112, limiting the movement of the sealing ring 110 in the pipe removal direction, limiting a deformation of the grip ring 112 in the pipe insertion direction and supporting the pipe. The diameter of the opening 109, defined by the rolled-over end 108 and into which the pipe is to be inserted, is larger than the diameter of the projection 104 such that said end 108 will not engage the pipe, whereas the teeth 114 are configured to engage the pipe.

As soon as the pipe is inserted into the housing 100 through the opening 109 a seal between the pipe and the housing 100 is obtained by a compression of the sealing ring 110, whereas retention of the pipe within the housing 100 is provided by the engagement of the teeth 114 upon the pipe.

WO 2005/114031 A2 also describes a release tool 200 shown in FIG. 1b enclosed herewith. Such a release tool 200 is necessary to release the pipe from the pipe fitting arrangement shown in FIG. 1a by urging the teeth 114 of the grip ring 112 out of engagement with the pipe. For this purpose the release tool 200 is provided with an opening 202 for the pipe and a main body 204 with a projection 206 adapted to be inserted into the housing 100, said insertion being limited by the projection 104 of the housing 100. The main body 204 is provided with a V-shaped split 204a as well as a material thinning or recess 204b for facilitating an attachment around the pipe and a front face 204c for engagement with the housing 100, in particular the rolled-over end 108 thereof. The projection 206 comprises a cylindrical portion 206a and chamfered portion 206b facilitating the insertion between the pipe and the housing 100.

In order to engage the release tool 200 of FIG. 1b with the pipe fitting arrangement of FIG. 1a, the tool is aligned relative to the pipe such that the longitudinal axis thereof is running parallel to the longitudinal axis of the pipe. Then the release tool 200 can be opened in the region of the split 204a and thereafter pushed against the pipe with the opened split 204a facing the pipe, whereas the region next to the recess 204b serves as a hinge for facilitating such an opening. As soon as the pipe has been completely entered into the opening 202 the split 204a will close again due to spring forces provided by the main body 204. In a next step the release tool 200 can be slid on the pipe in the direction of the housing 100 with the projection 206 leading and, thus, when passing the teeth 114, forcing them radially outward. Finally, the pipe can be drawn out off the housing 100 as it is no longer retained therein by the teeth 114. As soon as the pipe has been completely removed out of the housing 100, the release tool 200 can also be removed therefrom.

An alternative release tool for disengaging teeth from a pipe in order to remove the pipe from a coupling is known from EP 1 521 027 B 1. Said release tool comprises a first member in form of a pusher to be inserted into the coupling to urge the teeth radially outward and, thus, releasing the engagement thereof with the pipe, and a second member in form of a cap to be screwed onto the coupling for engaging the first member. In particular, the cap can be screwed onto the coupling as well as the pusher and thereby moving the pusher in the pipe insertion direction, whereas an unscrewing of the cap leads to a movement of the pusher in the pipe removal direction.

DE 33 22 202 A1, U.S. Pat. No. 4,586,734 and NL 8204763 all describe tools for pipe joint assembly in form of pliers or tongs. Another tool for pipe connection systems is disclosed in WO 99/43978 having a U-shape with a pivotable portion at one of its free ends. EP 0 737 832 A1 as well as US 2006/0053608 A1 disclose pipe disassembling tools in the form of tongs.

Further, it is a major problem of the known pipe fitting arrangements that they might have leak paths due to scratches or the like on the pipe surface as a result of the teeth of the grip ring urging against the pipe when inserting the same into the housing. This problem has been addressed for screw connections in DE 20 2005 001 100 U1, but not for push connections. In fact it is proposed by DE 20 2005 001 100 U1 to make usage of a grip ring the internally extending teeth thereof defining with their free ends an inner diameter larger than the outer diameter of the tube in the relaxed state of the grip ring. As soon as all parts are screwed together the grip ring is forced to lie between a pressure ring and a swivel nut with its diameter being reduced such that the teeth thereof are engaging the pipe. This leads to a very complicated structure as it requires in addition to the housing said pressure ring and swivel nut.

It is the object of the present invention to provide a combined insertion and release tool for a pipe fitting arrangement avoiding any damaging of the pipe when being inserted into or removed from the pipe fitting arrangement and being easy to handle.

This object is achieved according to the invention by a tool for a pipe fitting arrangement in which a pipe is retainable arranged within a housing by teeth of a grip ring placed within the housing, the tool comprising: first engagement means for engaging at least partly around the pipe, said first engagement means having at least one part adapted to enter the housing around the pipe in order to force the teeth of the grip ring out of engagement with the pipe, second engagement means for engaging the first engagement means as well as the housing in order to locate the housing relative to the tool, in particular within the tool, and a handle connected or connectable with the second engagement means and provided with actuation means, with the actuation means serving to urge the second engagement means either to engage the housing or disengage the housing, with the first engagement means being inserted into the housing when the second engagement means engages the housing as well as the first engagement means such that insertion of the pipe into the housing and removal of the pipe from the housing without the teeth of the grip ring touching the pipe is ensured, and the first engagement means being connected to the second engagement means via at least one first joint being in form of a pivot and/or at least one first spring means in order to be at least partly displaceable relative to the second engagement means.

With the invention it is also proposed that the first spring means is comprised by the actuation means. Embodiments of the invention can also be characterized in that the first engagement means comprises a main body, in particular in form of a ring, having at least one face or shoulder, adapted to engage the end of the housing into which the pipe is to be inserted or from which the pipe is to be removed, and a first opening for the pipe, said first opening preferably being defined by the face or shoulder and/or being variable and/or adjustable, most preferably via the actuation means and/or second spring means, in particular the second spring means and the first spring means being formed together.

The invention also proposes that the main body is deformable, preferably being formed at least partly from elastic or spring material, and/or can be opened, preferably by comprising at least one split, most preferably two opposing splits.

A tool according to the invention can be further characterized in that the main body comprises at least one, in particular angled, extension next to one split, preferably two such extensions one on each side of the split, to facilitate entering of the pipe into the first engagement means through the split.

It is preferred that the main body is formed by two halves being connected to each other, preferably via a third spring means, in particular the third spring means and the second spring means being formed together, and/or at at least one second joint, in particular in form of a pivot, arranged next to a split, in particular on both sides of the slit, most preferably the split opposite the extension(s), in particular the second joint being identical to the first joint The invention in addition proposes that the at least one part of the first engagement means has a tube-like form, preferably having at least one split, most preferably two opposing splits and/or is provided with a chamfer or tapering off towards its free end for facilitating its insertion into the housing.

It is preferred according to the invention that the at least one part of the first engagement means is formed as a projection of the main body surrounding the first opening at least partly.

Still further embodiments of the invention can be characterized in that the second engagement means comprises first holding means for engagement with the housing as well as second holding means for engagement with the first engagement means, the housing being preferably locatable between the two holding means and/or the holding means being preferably moveable relative to each other via the actuation means, in particular the first spring means being arranged between the two holding means.

The first holding means can comprise a substantially U-shaped first body, preferably in form of a first jaw, and/or the second holding means can comprise a substantially U-shaped second body, preferably in form of a second jaw.

With the invention it is also proposed that the first holding means has a second opening for the housing and/or the second holding means has a third opening for the pipe, the second and/or third opening being preferably variable and/or adjustable, in particular via the actuation means and/or third spring means for facilitating the insertion of the pipe and/or housing, the third spring means most preferably being formed together with the first and/or second spring means.

The second opening can be provided between two halves of the first holding means being pivotably connected to each other, preferably via at least one third pivot, most preferably being identical to the first joint, and/or the third opening can be provided between two halves of the second holding means being pivotably connected to each other, preferably via at least one fourth joint, most preferably being identical with the third joint.

Special embodiments of the invention are characterized in that the first, second and/or third spring means comprise(s) at least one elastic ring, in particular a rubber O-ring, arranged substantially perpendicular to a longitudinal axis of the first, second and/or third opening, preferably the first spring means being arranged within at least one recess of the main body and/the first holding means, or the first, second and/or third spring means ($24'ga$, $24'gb$, $24'h$) comprise(s) at least one spiral spring. The first holding means can be adapted to engage the housing outer surface between a first internal projection or shoulder or bend of the housing for limiting insertion of the pipe into the housing and a second internal projection or shoulder or bend of the housing for limiting movement of a sealing ring in the pipe insertion direction or between said second internal projection or shoulder or bend and a third internal projection or shoulder or bend of the housing for limiting movement of the grip ring in the pipe insertion direction and/or limiting movement of the sealing ring in the pipe removal direction.

It is also proposed that the first holding means is adapted to engage the housing outer surface next to at least one external shoulder or projection and/or within a recess or groove.

According to the invention it is preferred that the handle and the actuation means are formed as a plier's and/or ratchet's handle and actuation means and/or comprise tong grippers.

Other embodiments of the invention are characterized in that the handle, preferably in U-shape, is connected to the first and the second holding means, most preferably with one holding means provided at each free end and/or the handle, preferably comprising a pair of tong grippers, is, in particular detachably, connectable with the first and second holding means, preferably via gripper fingers and/or a snap connection.

It is also preferred according to the invention that the free ends of the handle are moveable towards each other via the actuating means and away from each other, preferably by moving a slider bar, in particular within a slot provided in each arm of the U-shaped handle, to the free ends and away therefrom.

The slider bar can be positioned substantially parallel to the longitudinal axis of the first, second and/or third opening and/or fixable in at least two positions.

Further, the tool of the invention can be further characterized in that the slider bar has at least one recess, preferably four recesses, for the engagement with the handle in order to guide the sliding thereof, said recesses being most preferably variable and/or adjustable in order to adapt the tool to different pipe fitting arrangements.

Another preferred embodiment of the invention is characterized in that each gripper finger is provided with a projection, and the first as well as the second holding means are each provided with a recess for such a projection in order to allow a snap connection.

The invention also provides a method for inserting a pipe into a housing for obtaining a pipe fitting arrangement and for removing the pipe out of the housing of a pipe fitting arrangement by making usage to a tool according to the invention, with the housing having arranged therein a grip ring and a sealing ring in insertion direction, preferably the axial position of the grip ring and the sealing ring being restricted, in particular by internal projections or shoulders or bends of the housing.

It is preferred that the insertion of the pipe into the housing comprises the following steps:
  a) locating the housing within the tool, preferably the tool being in a first open position with the second engagement means, in particular the first holding means thereof, engaging the housing,
  b) inserting the first engagement means into the housing thereby forcing the teeth of the grip ring outwardly until the free ends thereof define an inner diameter being larger than the outer diameter of the pipe, preferably by actuating the tool via the actuating means such that the tool comes into a second close position with the first engagement means being engaged by the second engagement means engaging the housing, c) inserting the pipe into the housing through the first engagement means, d) removing the first engagement means out of the housing thereby allowing the teeth of the grip ring to engage the pipe, preferably by actuating the tool via the actuating means such that the tool comes into the first open position, and e) removing the tool from pipe fitting arrangement.

Step c) can comprise that the pipe is inserted until it abuts against the housing, preferably the first projection or shoulder or bend thereof.

It is also preferred according to the invention that the removal of the pipe from the housing with the teeth engaging the pipe comprises the following steps:

i) locating the tool around the pipe fitting arrangement, preferably the tool being in its first open position with the second engagement means engaging the housing, ii) inserting the first engagement means into the housing thereby disengaging the teeth of the grip ring from the pipe by forcing them outwardly until the free ends thereof define an inner diameter larger than the outer diameter of the pipe, preferably by actuating the tool via the actuating means such that the tool comes into its second close position, and iii) removing the pipe from the pipe fitting arrangement and the first engagement means.

With the invention it is in addition proposed that step a) and/or step i) comprise(s) that the housing is aligned relative to the tool, preferably the longitudinal axis of the housing being parallel to the longitudinal axis of the first, second and third opening, and the tool is pushed against the housing, preferably perpendicular to said longitudinal axes.

Still further it is proposed that step i) comprises that the split(s) of the first engagement means is/are opened when pushing the tool against the housing as soon as abutting against the pipe and closed when the first engagement means completely surrounds the pipe, preferably by the second spring means.

It is preferred according to the invention that step b) and/or step ii) comprise(s) that the at least one part of the first engagement means is inserted into the housing until the teeth of the grip ring abut against the housing, preferably the third projection or shoulder or bend thereof.

The following steps are also proposed by the invention after having removed the pipe from the pipe fitting arrangement:

iv) removing the first engagement means out of the housing, preferably by actuating the tool via the actuating means such that the tool comes into its first open position, and v) removing the housing from the tool.

Still further the method according to the invention can be characterized in that step b) and/or step ii) comprise(s) that the slider bar is moved towards the holding means to bring the tool in its second close position, and/or step d) and/or step iv) comprise(s) that the slider bar is moved away from the holding means to bring the tool in its first open position.

Finally the method of the invention can be characterized by assembling the tool prior to insertion of the pipe into the housing or removal of the pipe from the housing, in particular by a snap connection, preferably between the tong grippers and the second engagement means, and/or disassembling the tool after insertion of the pipe into the housing or removal the pipe from the housing, in particular by a snap connection, preferably between the tong grippers and the second engagement means.

It is therefore the astonishing perception of the invention that a combined insertion and release tool can be provided with a simple structure and easy to be handled by a user. In fact the tool of the invention allows the user to locate a fitting or housing within the tool, whereupon by mechanical means the diameter of a grip ring within said housing can be opened such that a pipe without being damaged can be inserted into the housing and removed therefrom. The work of the user is further facilitated, not only by the easy handling of the tool, but also by reducing the efforts required by the user to manually push the pipe into the housing and thus complete the joint in order to obtain a fluid tight, even gas tight, pipe fitting arrangement.

With the invention it is also proposed to provide the tool in two parts which can be easily attached to each other via a snap connection or the like. This has the advantage that a first part for engaging the housing and/or the grip ring can be easily exchanged in adaption to said housing and/or grip ring.

The invention will now be further described, by way of example, with reference to the accompanying drawings, in which.

Figure 1A:
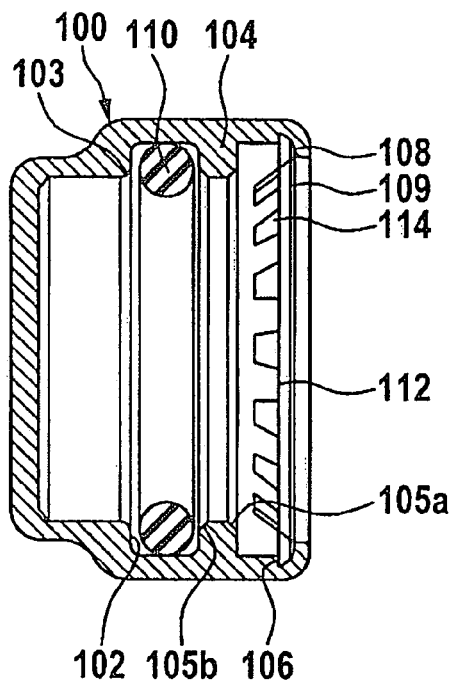
FIG. 1a is a longitudinal cross-sectional view of a housing of a known pipe fitting arrangement.
Figure 1B:
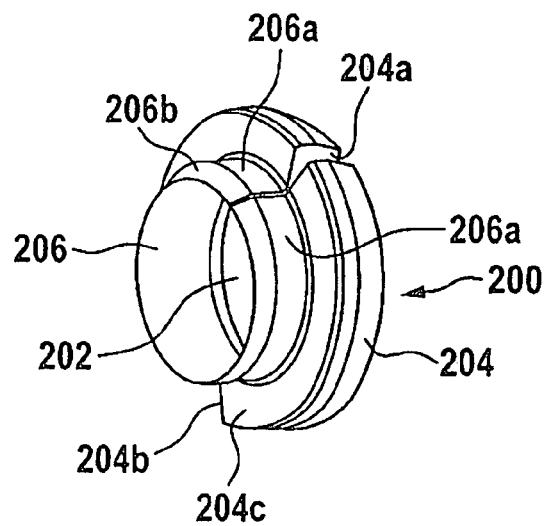
FIG. 1b is a perspective view of a known release tool.
Figure 2A:
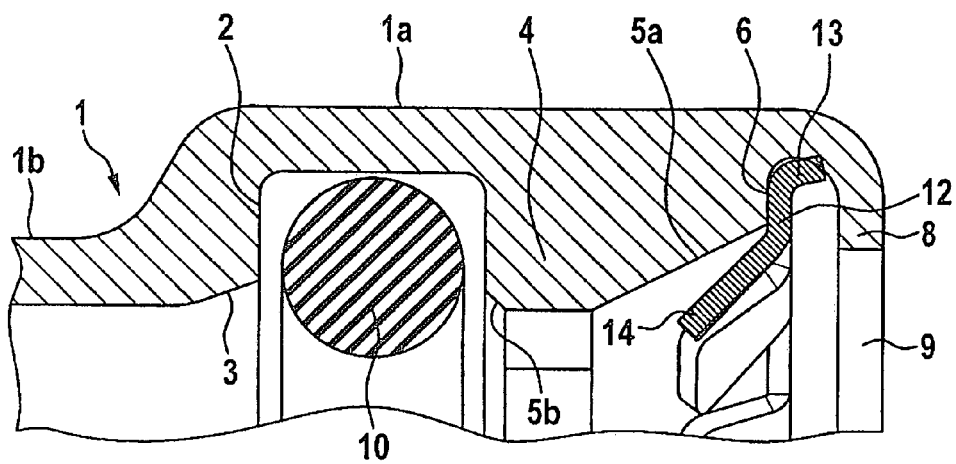
FIG. 2a is a part longitudinal cross-sectional view of a housing of a pipe fitting arrangement, prior to insertion of a pipe.
Figure 2B:
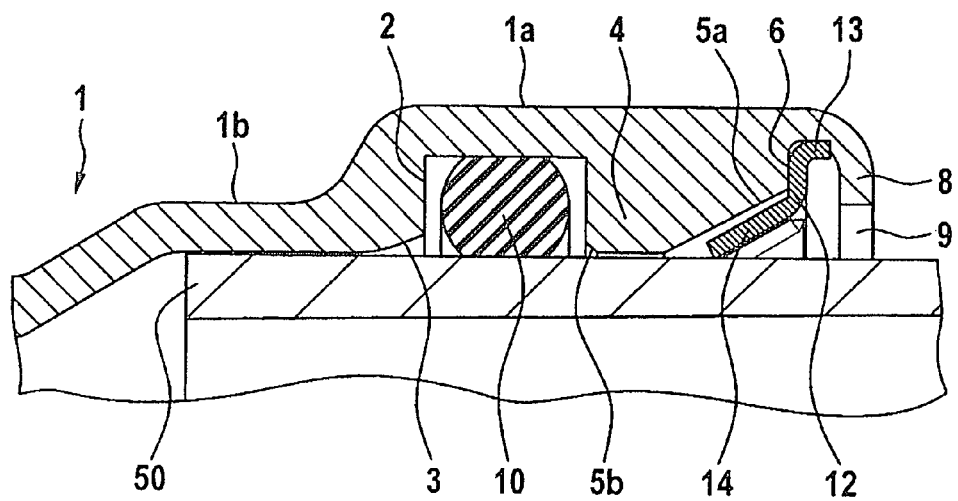
FIG. 2b is a part longitudinal cross-sectional view of the housing of FIG. 2a with an inserted tube.
Figure 3:
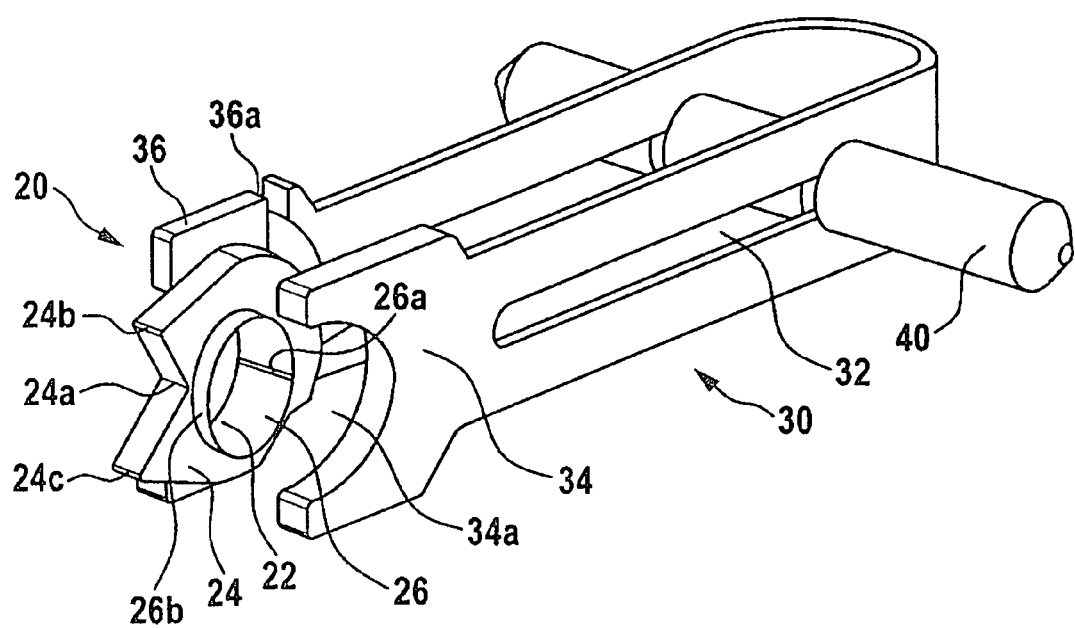
FIG. 3 is a perspective view of an insertion and release tool of the invention.
Figure 4A:
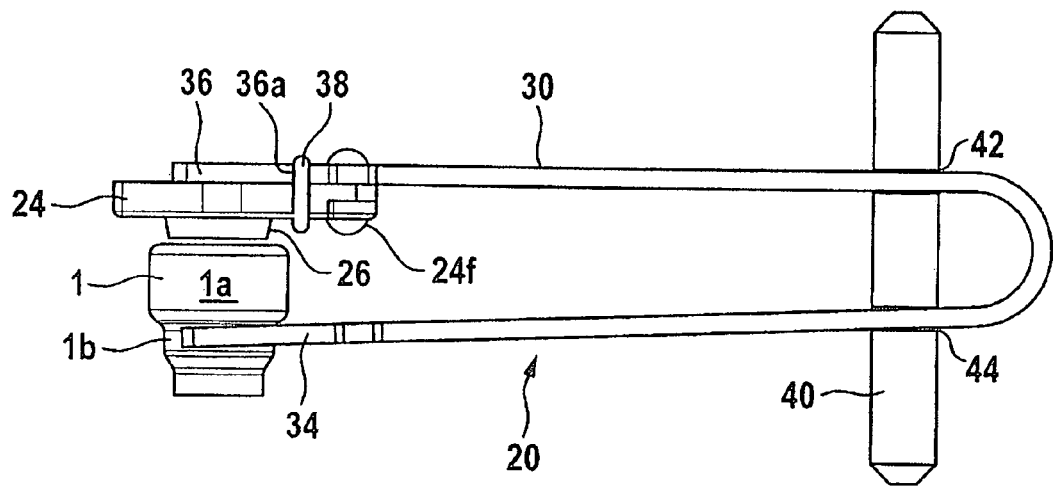
FIG. 4a is a top view of the tool of FIG. 3 with a housing of FIG. 2a, the tool being in its open position.
Figure 4B:
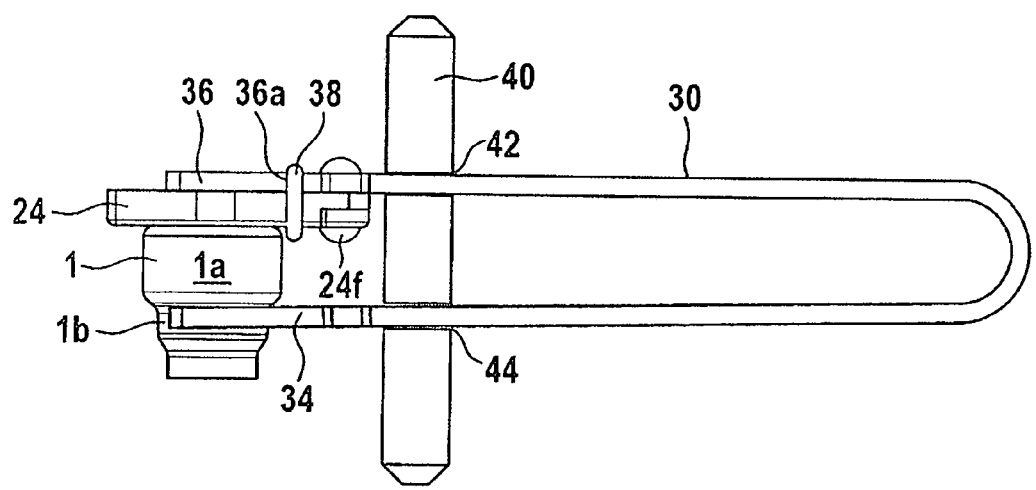
Figure 5A:
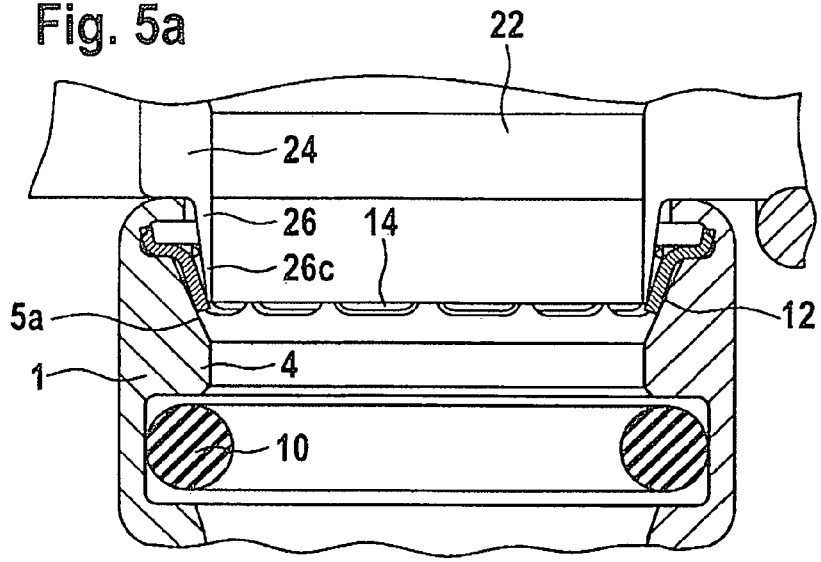
Figure 5B:
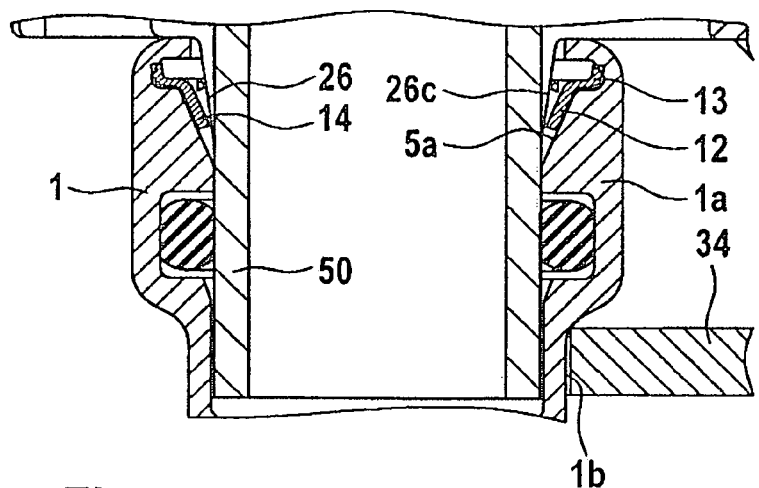
Figure 5C:
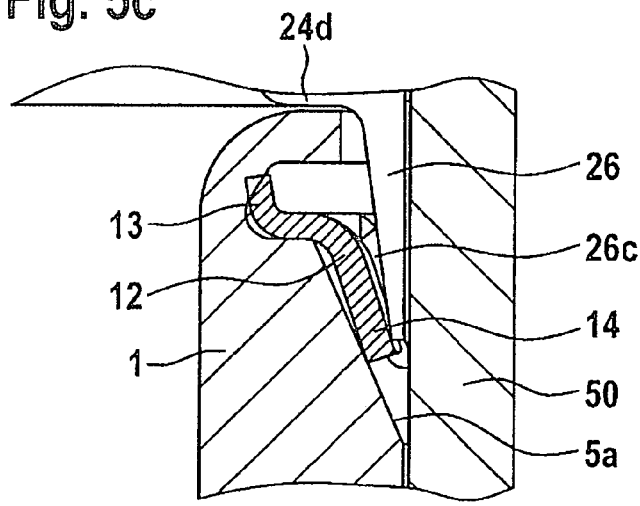
Figure 5D:
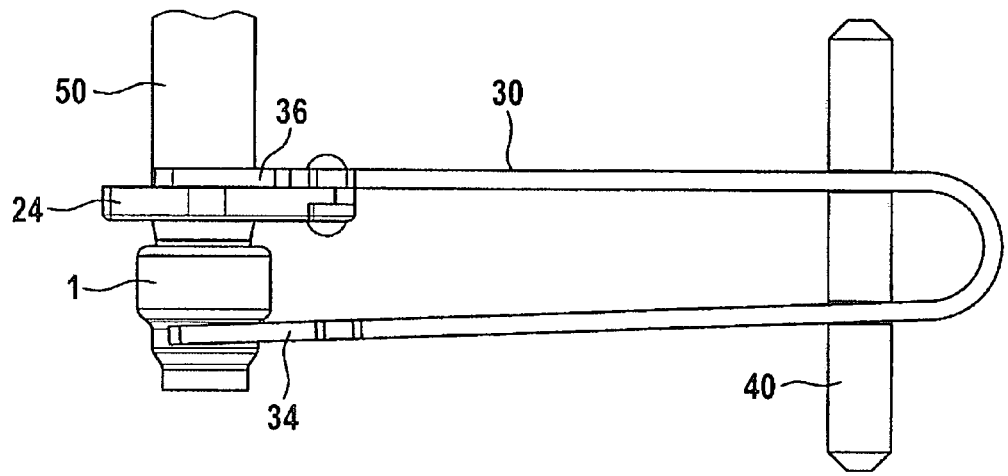
Figure 5E:
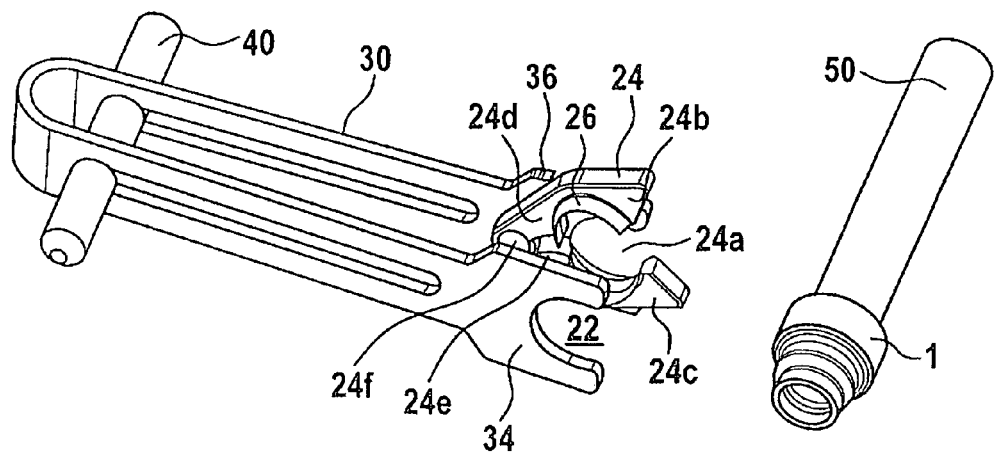
Figure 6A:
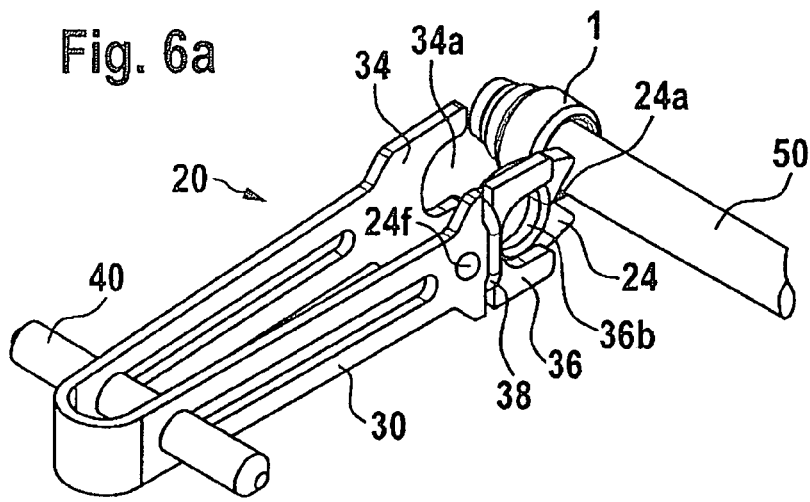
Figure 6B:
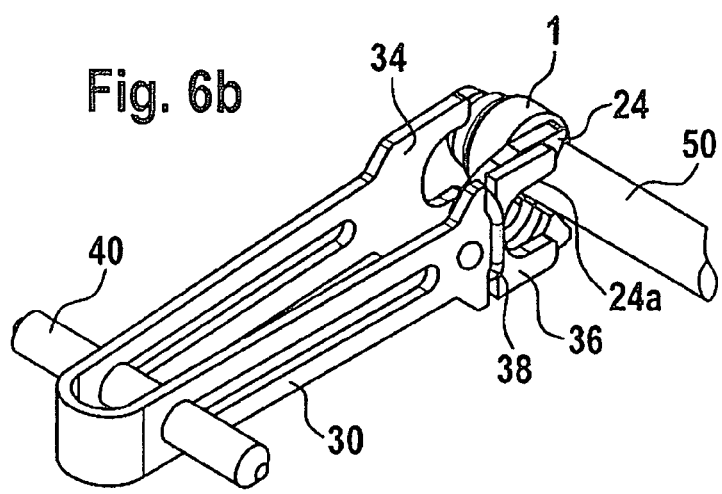
Figure 6C:
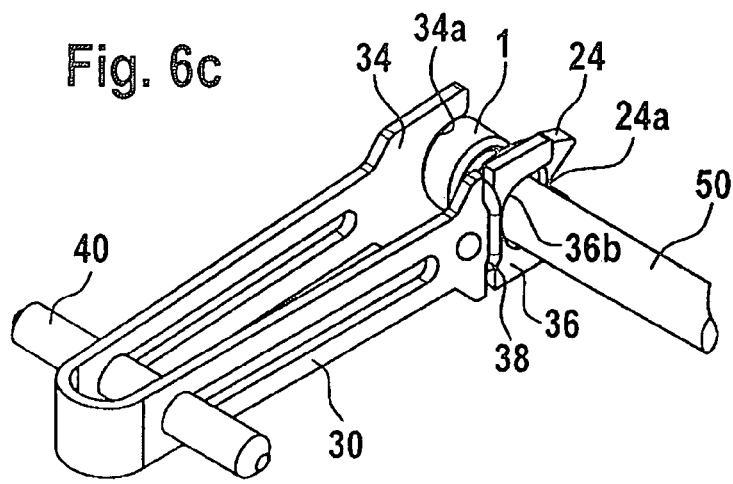
Figure 7A:
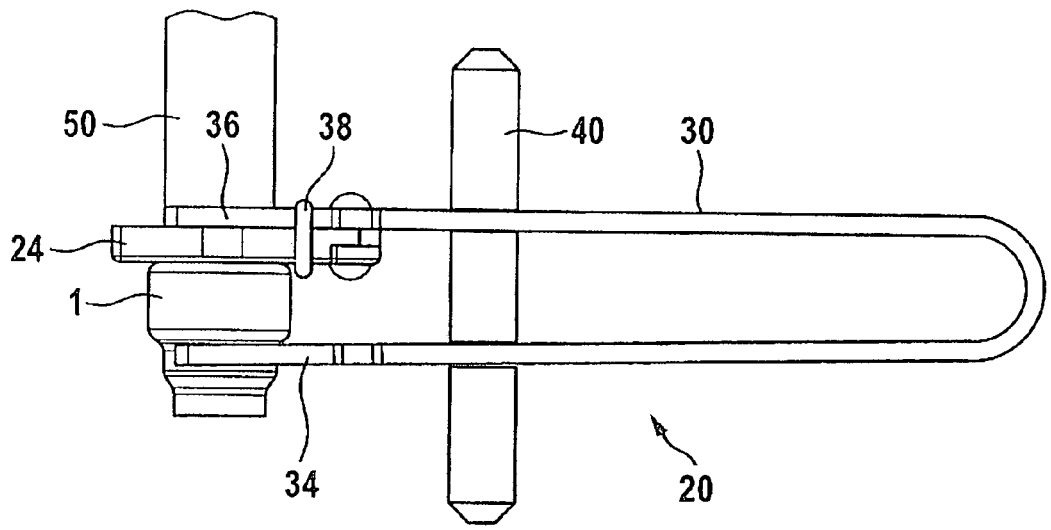
Figure 7B:
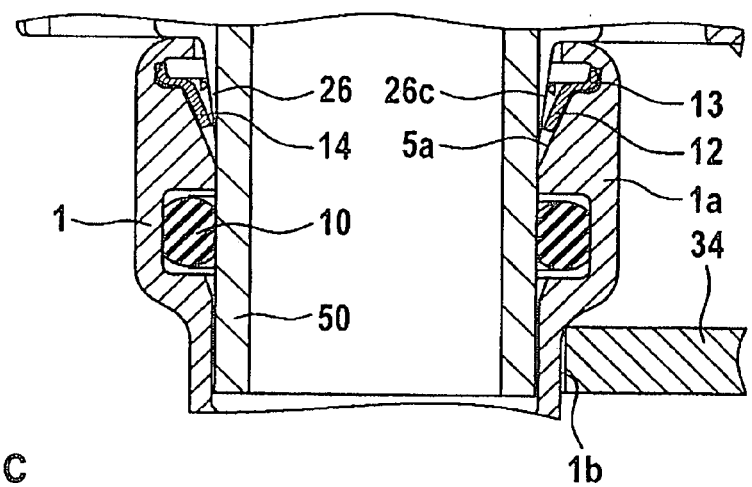
Figure 7C:
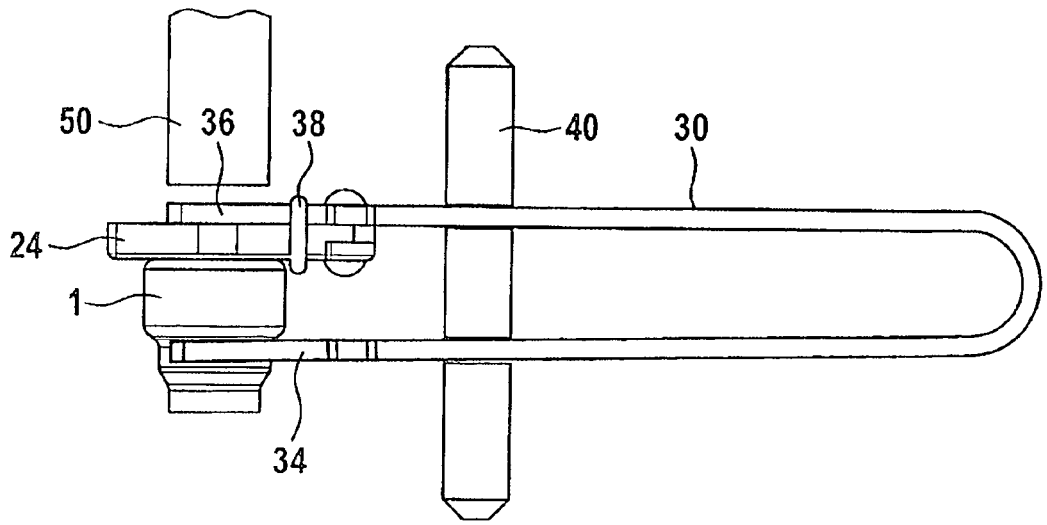
Figure 8A:
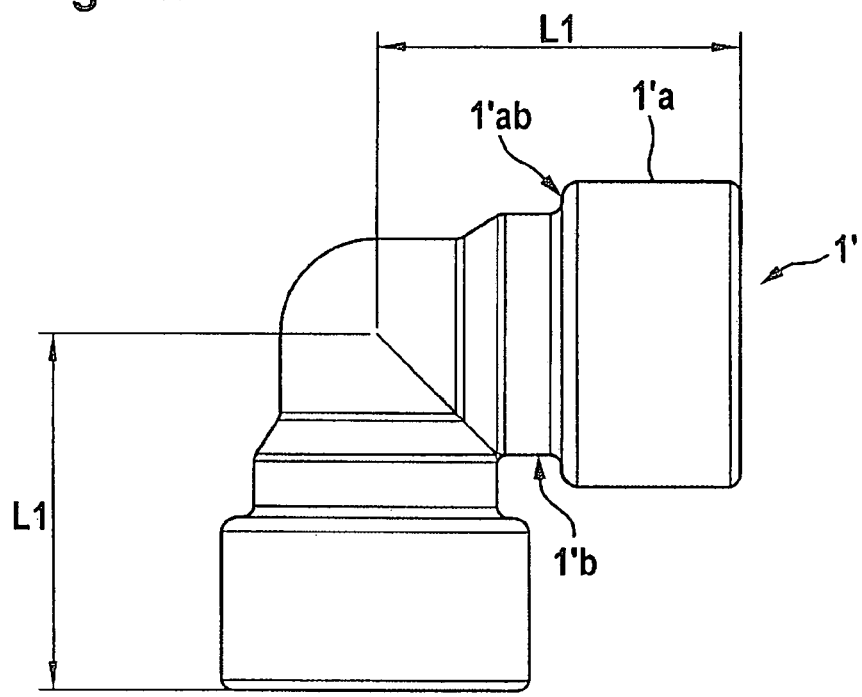
Figure 8B:
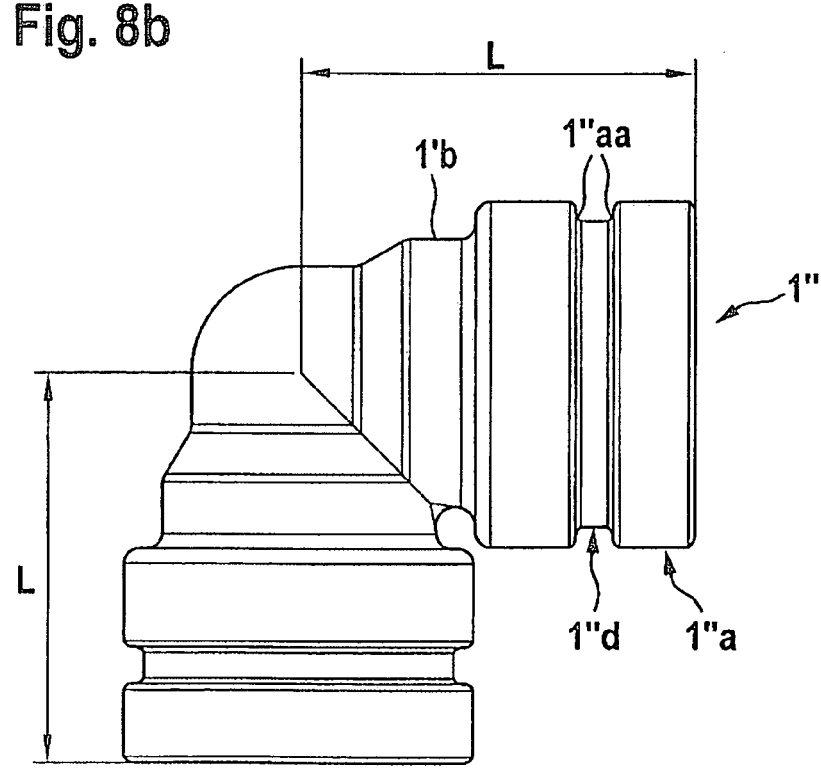
Figure 9A:
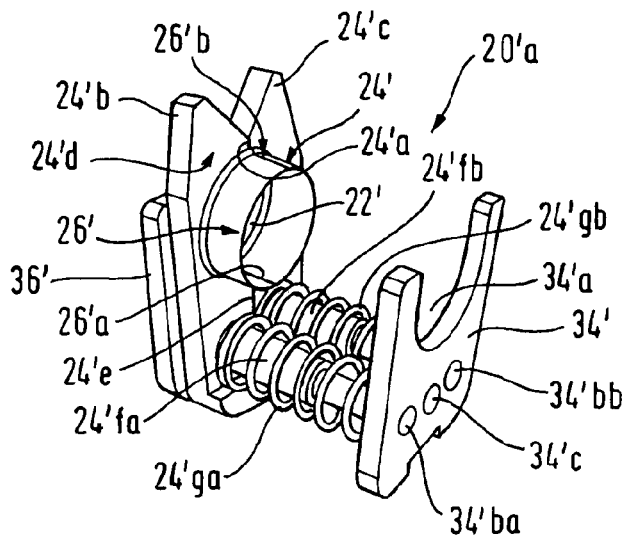
Figure 9B:
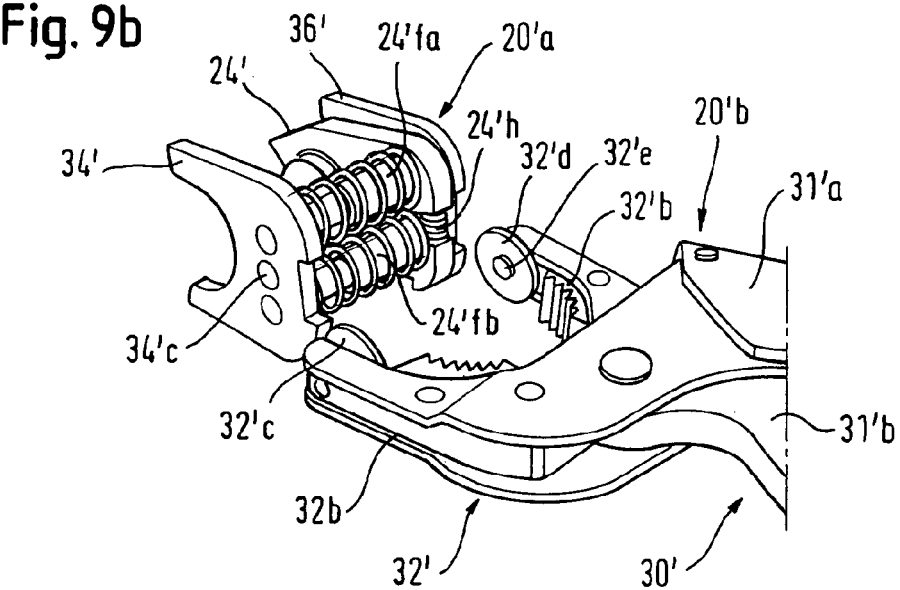
Figure 9C:
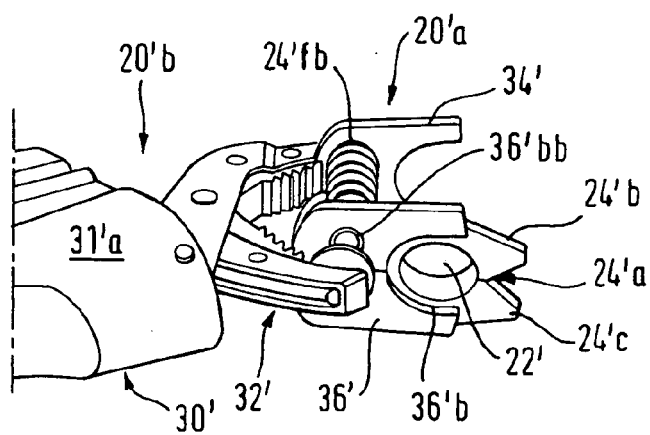

FIG. 4b corresponds to FIG. 4a except for the tool being shown in its close position;

FIG. 5a is a part longitudinal cross-sectional view of the tool of FIG. 3 corresponding with the housing FIG. 2a;

FIG. 5b is a view like FIG. 5a with the pipe being inserted;

FIG. 5c is an enlargement of a part of FIG. 5b;

FIG. 5d is a top view of the tool and the pipe fitting of FIG. 5b;

FIG. 5e is a perspective view of the tool of FIG. 3 and the pipe fitting arrangement of FIG. 2b;

FIGS. 6a to 6c demonstrate the attachment of the pipe fitting arrangement of FIG. 2b to the tool of FIG. 3;

FIGS. 7a to 7c demonstrate the removal of the pipe from the pipe fitting arrangement of FIG. 2b with the help of the tool of FIG. 3;

FIGS. 8a and 8b show side views of two different housings of a pipe fitting arrangement; and FIGS. 9a to 9c are prospective views of another tool of the invention provided in two parts, demonstrating the connection of said parts.

As can be seen from FIG. 2a, a pipe fitting arrangement comprises a housing 1 having a first shoulder 2 with a chamfer 3, a projection 4 providing a second shoulder with a chamfer 5b, a third shoulder with a chamfer 5a next to a fourth shoulder 6 and a folded end 8 defining an opening 9. Between the first shoulder 2 and the second shoulder of the projection 4 a sealing ring 10 is arranged, whereas between the fourth shoulder 6 and the folded end 8 a grip ring 12 is arranged. The grip ring 12 comprises first external teeth 13 engaging the housing 1 and second internal teeth 14 engaging a pipe as soon as having been inserted into the housing 1 through the opening 9 as shown in FIG. 2b, with the movement of the grip ring 12 being limited by the third and fourth shoulder of the projection 4.

Thus, FIG. 2b is depicting a pipe fitting arrangement with a pipe 50 ensuring a seal due to compressing the sealing ring 10 while abutting in particular against the projection 4, whereas retention of the pipe 50 within the housing 1 is provided by the engagement of the internal teeth 14 of the grip ring 12 on the pipe 50. Still further, a rotation of the pipe 50 relative to the housing 1 is inhibited by the opposite orientation of the external and internal teeth 13, 14 of the grip ring 12. The internal teeth 14 engaging the pipe 50 and the external teeth 13 engaging the housing 1 in addition ensure electric continuity between the pipe 50 and the housing 1 as the grip ring 12 is formed from a metal.

The housing 1 is provided with a step like outer surface, namely a first step 1a in the region of the sealing ring 10 and grip ring 12 comprising the first shoulder 2 and the projection 4 and a second step 1b provided between the first shoulder 2 and a bend 1c of the housing 1 serving as a limit stop for the pipe 50.

An insertion and release tool of the invention for such a pipe fitting arrangement is shown in FIG. 3. Accordingly, the pincers like tool 20 is provided with an opening 22 for the pipe fitting arrangement, a first engagement means for engaging the housing 1 and/or the pipe 50 and a second engagement means for engaging the first engagement means and/or the housing 1 as explained in detail in the following:

The first engagement means comprises a two part ring 24 with a first split 24a at one end of the tool 20, bordered by two angled extensions 24b, 24c, a further split 24e (as can be best seen in FIG. 5e) opposite the first split 24a and a joint in form of a pivot 24f next to the further split 24e (as can be best seen in FIG. 5e) for facilitating the connection with the pipe 50 (as can be best seen in FIGS. 6a to 6c). The ring 24 also has a front face 24d for engaging the rolled-over end 8 of the housing 1 (as can be best seen in FIG. 5c). Further, the ring 24 is provided with a projection 26 projecting from the front face 24d in order to be inserted into the housing 1 and being provided with two opposing splits 26a, 26b corresponding to the splits 24a, 24e of the ring 24 and a chamfer 26c (as can be best seen in FIG. 5c) for facilitating the insertion between the pipe 50 and the housing 1.

The second engagement means comprises a first holding means in form of a jaw 34 for engaging the housing 1 within an opening 34a and a second holding means in form of a jaw 36 for engaging the first engaging means. The jaws 34 and 36 are connected with each other via an U-shaped handle 30 provided with slots 32 along its two arms. The second jaw 36 is also provided with two recesses 36a for positioning a rubber O-ring 38 forming spring means, which also surrounds the two parts of the ring 24 next to the further split 24e. The ring 24 is connected to the second jaw 36 by the pivot 24f. In FIG. 3 the tool 20 is shown in its open position with a maximum distance between the two tool jaws 34, 36. Said distance can be reduced by actuating an actuation means comprising a slider bar 40 guided within the slots 32. The slider bar 40 is provided with recesses 42, 44 (as can be best seen in FIG. 4a) in order to stay within the slots 32.

With respect to FIGS. 4a to 5e a method for forming the pipe fitting arrangement as shown in FIG. 2b with the help of the tool 20 as shown in FIG. 3 will be described:

The tool 20 is put in its open position with the slider bar 40 being retracted as shown in FIG. 3 such that the housing 1 can easily be placed within the tool 20, with the jaw 34 engaging the step 1b as shown in FIG. 4a.

In the next step the slider bar 40 is moved towards its opposite position in the slots 32 to bring the tool 20 in its close position securing the housing 1 between its jaws 34 and 36 by moving the jaws 34, 36 towards each other. In this position the ring 24, in particular its front face 24d, abuts against the housing 1, see FIG. 4b. Thus, when moving the tool 20 from its open position to its close position the projection 26 is pushed into the housing 1 and thereby forcing the grip ring teeth 14 radially outward to engage the chamfer 5a of the fitting 1, see FIG. 5a.

FIG. 5b illustrates the next step of operation, in which the pipe 50 is inserted through the opening 22 of the ring 24 and projection 26 into the housing 1 without making contact with the teeth 14 and without requiring large pushing forces by a user (not shown). In fact, there is a clearance between the grip ring 12 and the outer surface of the tube 50 due to the insertion of the projection 26 as can be clearly seen from FIG. 5c.

To remove the tool 20 upon completion of the pipe insertion the slider bar 40 is retracted in order to open the tool 20 as the handle 30 springs back in its relaxed state, see FIG. 5d. During opening the tool 20 the projection 26 is retracted from the pipe fitting arrangement thereby allowing the teeth 14 to relax and finally engage the tube 50 as shown in FIG. 2b.

Finally, the tool 20 can be removed from the pipe fitting arrangement by opening the split 24a as illustrated in FIG. 5e.

To release a previously fitted joint, that is the press fitting arrangement as shown in FIG. 2b, by removing the pipe 50 the following sequence of steps can be conducted:

At the beginning the tool 20 is aligned to the pipe 50 and the housing 1, namely such that the slider bar 40 runs substantially parallel to the tube 50 while being in its retracted position such that the tool 20 is in its open position as shown in FIG. 6a.

In a next step the tool 20 as such is pushed against the pipe 50 and the housing 1 until the angled extensions 24b, 24c of the ring 4 are engaged against the pipe 50, which in turn opens the split 24a as shown in FIG. 6b.

Pushing the tool 20 further against the pipe 50 and the housing 1 will finally result in the ring 24 surrounding the pipe 50, with the ring 24 being returned to its closed position having the split 24a closed by means of the spring 38. In this position the jaw 36 surrounds the pipe 50 within its opening 36b and the jaw 34 engages the housing 1 within its opening 34a as shown in FIG. 6c.

The slider bar 40 now has to be moved in the direction of the pipe fitting arrangement 1, 50 in order to close the tool 20 as shown in FIG. 7a. While closing the tool 20 the projection 26 penetrates between the tube 50 and the housing 1 and thereby forces the teeth 14 out of engagement with the pipe 50 as illustrated in FIG. 7b.

As soon as the teeth 14 are no longer engaging the tube 50 the latter can be retracted out of the housing 1 as shown in FIG. 7c.

Thus, the tool 20 of the invention facilitates the connection and the release of a pipe fitting arrangement, is easy to handle and, simultaneously, avoids any damaging of the different components of the pipe fitting arrangement, in particular the pipe thereof, such that the pipe fitting arrangement, even after having been connected and released for several times, still is fluid tight.

The handling of the tool 20 is more difficult in case the housing is formed in an elbow shape, like the housing 1' of FIG. 8a, although such a housing 1' is also provided with two steps 1'a, 1'b on its outside providing a shoulder 1'ab therebetween which can be engaged by the tool 20, in particular by its jaw 34. The difficulty is a result of the length L1 between a free end of the housing 1' and its centre having to be sufficient to allow such an engagement. Therefore it is beneficial to provide an elbow shaped housing with a special geometry for the jaw 34 as shown in FIG. 8b. That is, the housing 1" is still provided with two steps 1"a and 1"b and in addition a groove 1"d between two shoulders 1"aa provided in step 1"a. Thus, the groove 1"d serves as a tool location groove facilitating the handling of a tool 20 as the jaw 34 can be arranged with its inner edge within the groove 1"d avoiding long housing lengths L1. With other words, the length L from the outer ends of the housing 1" to its centre shown in FIG. 8b can be less than the corresponding length L1 shown in FIG. 8a and still allows for an easy handling of the tool 20.

Another tool of the invention is described in the following with respect to FIGS. 9a to 9c. This second tool 20' differs from the first tool 20 in that it is provided in two parts with a first part 20'a comprising a first engagement means 24' and second engagement means 34', 36' and a second part 20'b comprising a handle 30'. The two parts 20'a and 20'b are connectable via a snap connection as will be described later on in detail such that in adaptation to a special housing and/or grip ring the first part 20'a can easily be exchanged.

The first engagement means comprises a two part ring 24' with two opposite splits 24'a and 24'e, two angled extensions 24'b, 24'c, a front face 24'd and a projection 26'. The two parts of the ring 24' are interconnected via a spring 24'h as can be seen in FIG. 9b are connected and to the second engagement means 34', 36' each via a pivot 24'fa, 24'fb and a further spring 24'ga, 24'gb, with the pivots 24'fa, 24fb extending through the second engagement means 34' and 36' through openings 34'ba, 34'bb, 36'bb.

The second engagement means comprises two holding means in form of jaws 34' and 36', said jaws 34' and 36' being interconnected via said pivots 24'fa, 24'fb and springs 24'ga, 24'gb and each do comprise an opening 34'a, 34'b for a pipe. In addition, said jaws 34', 36' each comprise an opening 34'c for receiving a projection 32'e of the second parts 20'b of the tool 20' in order to connect said two parts 20'a, 20'b.

The handle 30' of the second part 20'b comprises two tong holds 31'a, 31'b and two gripper fingers 32'a, 32'b, with the gripper fingers 32'a, 32'b being moved towards each other when urging the tong holders 31'a, 31'b together. The gripper fingers 32'a, 32'b are provided at their free ends each with a snap connector 32'c, 32'd with a projection 32'e, only one of which being shown in FIG. 9b, said two projections 32'e facing each other and are suited for engaging the recesses 34'c, only one of which being shown in FIG. 9c.

The tool 20' can be used for forming a pipe fitting arrangement as shown in FIG. 2b as follows:

The tool 20' is assembled by attaching the second part 20'b to the first part 20'a via a snap connection. The springs 24'fa and 24'fb will then urge the gripper fingers 32'a, 32'b as well as the jaws 34', 36' away from each other such that the tool 20' is in its open position.

In a next step a housing is inserted between the jaws 34', 36' such that the tool 20' can be brought in its closed position moving the jaws 34' and 36' towards each other against the force of the springs 24'fa, 24'fb via the gripper fingers 32'a, 32'b when urging the tong holder 31'b, 31'b towards each other. In the closed position of the tool 20' the projection 26' has entered the housing and forced teeth of a grip ring radially outwardly such that a pipe can be inserted into the openings 36'b, 22' and 34'a and, thus, into the housing.

Then the tool 20' can be put in its open position again by removing the force applied to the tong holders 31'a, 31'b such that the springs 24'fa, 24'ga will urge the jaws 34', 36' as well as the gripper fingers 32'a, 32'b away from each other. During said movement the projection 26' will move out of the housing such that the teeth of the grip ring can move radialy inwardly until they grip the pipe.

Finally, the tool 20' can be detached from the pipe fitting arrangement thus formed by opening the splits 26'b and 24'a and disassembling by detaching the connection between the first part 20'a and 20'b.

The thus formed pipe fitting arrangement can be detached again by using the tool 20'c in its assembled form and open position namely by entering the pipe fitting arrangement into the first part 20'a such that the pipe will extend through the openings 34'a, 22', 36'b and the housing being arranged between the jaws 34' and 36', without the projection 26' having yet entered into the housing.

As soon as the tool 20' is brought in its closed position by forcing the jaws 34', 36' towards each other against the force of the springs 24'fa, 24'f by urging the tong holders 31'a, 31'b towards each other, the teeth of the grip ring are again forced radially outwardly such that the pipe can easily be drawn out of the housing as well as the tool 20'.

Finally, the housing can be removed out of connection with the tool 20', and even the connection between the two parts 20'a, 20'b of the tool 20' can be detached.

Although modifications and changes may be suggested by those skilled in the art, it is the intention of the application to embody within the patent warranted hereon all changes and modifications as reasonably and probably come within the scope of this contribution to the art. The features of the present invention which are believed to be novel are set forth in detail in the appended claims. The features disclosed in the description, the figures as well as the claims could be essential alone or in every combination for the realization of the invention in its different embodiments.

REFERENCE SIGNS LIST

| | |
|---|---|
| 1, 1', 1" | housing |
| 1a, 1'a, 1"a, 1b, 1'b, 1"b | step |
| 1'ab, 1'aa | shoulder |
| 1c | bend |
| 1"d | groove |
| 2 | shoulder |
| 3 | chamfer |
| 4 | projection |
| 5a, 5b | chamfer |
| 6 | shoulder |
| 8 | folded end |
| 9 | opening |
| 10 | sealing ring |
| 12 | grip ring |
| 13 | external tooth |
| 14 | internal tooth |
| 20 | insertion and release tool |
| 22 | opening |
| 24 | ring |
| 24a, 24'a | split |
| 24b, 24'b, 24c, 24'c | angled extention |
| 24d, 24'd | front face |
| 24e, 24'e | split |
| 24f, 24'fa, 24'fb | pivot |
| 24'ga, 24'gb | spring |
| 24'h | spring |

-continued

| | |
|---|---|
| 26, 26' | projection |
| 26a, 26'a, 26b, 26'b | split |
| 26c | chamfer |
| 30, 30' | handle |
| 31'a, 31'b | tong hold |
| 32 | slot |
| 32' | tong gripper |
| 32'a, 32'b | gripper finger |
| 32'c, 32'd | snap connector |
| 32'e | projection |
| 34, 34' | jaw |
| 34a, 34'a | opening |
| 34'ba, 34'bb | opening |
| 34'c | recess |
| 36, 36' | jaw |
| 36a | recess |
| 36b, 36'b | opening |
| 36'bb | opening |
| 38 | O-ring |
| 40 | slider bar |
| 42 | recess |
| 44 | recess |
| 50 | pipe |
| 100 | housing |
| 102 | shoulder |
| 103 | chamfer |
| 104 | projection |
| 105a, 105b | chamfer |
| 106 | shoulder |
| 108 | rolled-over end |
| 109 | opening |
| 110 | sealing ring |
| 112 | grip ring |
| 114 | internal teeth |
| 200 | release tool |
| 202 | opening |
| 204 | main body |
| 204a | split |
| 204b | recess |
| 204c | front face |
| 206 | projection |
| 206a | cylindrical portion |
| 206b | chamfered portion |

The invention claimed is:

1. A tool for a pipe fitting arrangement in which a pipe is retainable within a housing by teeth of a grip ring placed within the housing, the tool comprising:
   first engagement means for engaging at least partly around a pipe, said first engagement means having at least one part configured to enter the housing around the pipe to force the teeth of the grip ring out of engagement with the pipe;
   second engagement means for engaging the first engagement means as well as the housing in order to locate the housing relative to the tool; and
   a handle connectable with the second engagement means and provided with actuation means, the actuation means serving to urge the second engagement means either to engage the housing or disengage the housing, with the first engagement means being inserted into the housing when the second engagement means engages the housing as well as the first engagement means such that insertion of the pipe into the housing and removal of the pipe from the housing without the teeth of the grip ring touching the pipe is ensured,
   wherein the first engagement means comprises a two-part ring and wherein each of the two parts of the ring is connected to the second engagement means via a respective pivot extending through the second engagement means such that the first engagement means is at least partly displaceable relative to the second engagement means along the pivots.

2. The tool according to claim 1, wherein the first engagement means is connected to the second engagement means via at least one first joint comprising one of the pivots and at least one first spring means, wherein the at least one first spring means is included in the actuation means.

3. The tool according to claim 1, wherein the first engagement means comprises a main body having at least one face configured to engage the end of the housing, into which the pipe is to be inserted or from which the pipe is to be removed, and a first opening for the pipe.

4. The tool according to claim 3, wherein the main body is at least one of deformable and openable.

5. The tool according to claim 3, wherein the main body can be opened and comprises at least one split and at least one angled extension next to the at least one split to facilitate entering of the pipe into the first engagement means through the split.

6. The tool according to claim 4, wherein the main body can be opened and is formed by two halves being connected to each other via a third spring means.

7. The tool according to claim 1, wherein the at least one part of the first engagement means has a tube like form.

8. The tool according to claim 3, wherein the at least one part of the first engagement means is formed as a projection of the main body surrounding the first opening at least partly.

9. The tool according to claim 1, wherein the second engagement means comprises first holding means for engagement with the housing and second holding means for engagement with the first engagement means, the holding means being moveable relative to each other via the actuation means.

10. The tool according to claim 9, wherein at least one of the first and second holding means comprises a substantially U-shaped body.

11. The tool according to claim 9, wherein the first holding means has a second opening for the housing and the second holding means has a third opening for the pipe, at least one of the second and third openings being adjustable via at least one of the actuation means and third spring means for facilitating the insertion of the pipe.

12. The tool according to claim 11, wherein the second opening is provided between two halves of the first holding means being pivotably connected to each other via at least one third pivot, the at least one third pivot being identical to the first joint, and the third opening is provided between two halves of the second holding means being pivotably connected to each other via at least one fourth joint, the at least one fourth joint being identical with the third joint.

13. The tool according to claim 9, wherein at least one of the first spring means, second spring means via which a first opening for the pipe in a main body of the first engagement means is adjustable, and third spring means connecting two halves of the main body comprises at least one elastic ring arranged substantially perpendicular to a longitudinal axis of at least one of a first opening, a second opening provided in the first holding means of the second engagement means for engagement with the housing, and a third opening provided in the second holding means for engagement with the first engagement means.

14. The tool according to claim 9, wherein the first holding means is configured to engage the housing outer surface between at least one of a first internal projection, a shoulder, and a bend of the housing for limiting insertion of the pipe into the housing and at least one of a second internal projection, a shoulder, and a bend of the housing for limiting movement of a sealing ring in the pipe insertion direction.

15. The tool according to claim 9, wherein the first holding means is configured to engage the housing outer surface at a position that is at least one of:
   next to at least one external projection; and
   within at least one of a recess and a groove.

16. The tool according to claim 1, wherein the handle and the actuation means are formed as at least one of a pliers' and a ratchet's handle and the actuation means comprise tong grippers.

17. The tool according to claim 9, wherein the handle is connected to the first and the second holding means, with one holding means provided at each free end.

18. The tool according to claim 17, wherein the free ends of the handle are moveable towards each other and away from each other via the actuating means.

19. The tool according to claim 18, wherein the free ends of the handle are moveable towards each other and away from each other via the actuating means by moving a slider bar, wherein the slider bar is positioned substantially parallel to the longitudinal axis of the first, second, and third opening and fixable in at least two positions.

20. The tool according to claim 18, wherein the free ends of the handle are moveable towards each other and away from each other via the actuating means by moving a slider bar and wherein the slider bar has at least one recess for the engagement with the handle in order to guide the sliding thereof, said recesses being at least one of variable and adjustable such that the tool is adapted to different pipe fitting arrangements.

21. The tool according to claim 18, wherein the handle comprises a pair of tong grippers detachably connectable with the first and second holding means via gripper fingers, each gripper finger being provided with a projection, and wherein the first and the second holding means are each provided with a recess for such a projection that ensures a snap connection.

22. A method for inserting a pipe into a housing for obtaining a pipe fitting arrangement and for removing the pipe out of the housing of a pipe fitting arrangement by making usage of a tool, the housing having a grip ring arranged therein in insertion direction, the tool comprising first engagement means for engaging at least partly around the pipe, said first engagement means having at least one part configured to enter the housing around the pipe to force the teeth of the grip ring out of engagement with the pipe; second engagement means for engaging the first engagement means as well as the housing in order to locate the housing within the tool; and a handle connected with the second engagement means and provided with actuation means, the actuation means serving to urge the second engagement means either to engage the housing or disengage the housing, with the first engagement means being inserted into the housing when the second engagement means engages the housing as well as the first engagement means such that insertion of the pipe into the housing and removal of the pipe from the housing without the teeth of the grip ring touching the pipe is ensured, wherein the first engagement means comprises a two-part ring, and wherein each of the two parts of the ring is connected to the second engagement means via a respective pivot extending through the second engagement means such that the first engagement means are at least partly displaceable relative to the second engagement means along the pivots, the method comprising:
   (a) locating the housing within the tool, the tool being in a first open position with the second engagement means engaging the housing,
   (b) inserting the first engagement means into the housing, thereby forcing the teeth of the grip ring outwardly until the free ends thereof define an inner diameter being larger than the outer diameter of the pipe by actuating the tool via the actuating means such that the tool comes into a second close position with the first engagement means being engaged by the second engagement means engaging the housing,
   (c) inserting the pipe into the housing through the first engagement means,
   (d) removing the first engagement means out of the housing, thereby allowing the teeth of the grip ring to engage the pipe by actuating the tool via the actuating means such that the tool comes into the first open position, and
   (e) removing the tool from the pipe fitting arrangement.

23. The method according to claim 22, wherein step (c) further comprises inserting the pipe until it abuts against the housing.

24. The method according to claim 22, further comprising removing the pipe from the housing with the teeth engaging the pipe by:
   (i) locating the tool around the pipe fitting arrangement, the tool being in the first open position with the second engagement means engaging the housing,
   (ii) inserting the first engagement means into the housing, thereby disengaging the teeth of the grip ring from the pipe by forcing them outwardly until the free ends thereof define an inner diameter larger than the outer diameter of the pipe by actuating the tool via the actuating means such that the tool comes into the second close position, and
   (iii) removing the pipe from the pipe fitting arrangement and the first engagement means.

25. The method according to claim 24, wherein at least one of steps (a) and (i) further comprises aligning the housing relative to the tool, the longitudinal axis of the housing being parallel to the longitudinal axis of a first opening in the first engagement means, and second, and third openings in the second engagement means, and the tool being pushed against the housing.

26. The method according to claim 25, wherein step (i) further comprises opening at least one split of the first engagement means when pushing the tool against the housing as soon as abutting against the pipe and closing the at least one split of the first engagement means when the first engagement means completely surrounds the pipe.

27. The method according to claim 26, wherein at least one of steps (b) and (ii) further comprises inserting the at least one part of the first engagement means into the housing until the teeth of the grip ring abut against the housing.

28. The method according to claim 24, further comprising:
   (iv) removing the first engagement means out of the housing by actuating the tool via actuating means such that the tool comes into the first open position, and
   (v) removing the housing from the tool.

29. The method according to claim 28, wherein at least one of steps (b) and (ii) further comprises moving a slider bar of the actuating means towards holding means of the second engagement means to bring the tool in the second close position, and wherein at least one of steps (d) and (iv) further comprises moving the slider bar away from the holding means of the second engagement means to bring the tool into the first open position.

30. The method according to claim 29, further comprising disassembling the tool after insertion of the pipe into the housing or removal of the pipe from the housing by a snap connection between tong grippers of the actuating means and the second engagement means.

31. The method according to claim 22, further comprising assembling the tool prior to insertion of the pipe into the housing or removal of the pipe from the housing by a snap connection between tong grippers of the actuating means and the second engagement means.

32. The tool according to claim 13, wherein the first, second, and/or third spring means comprise at least one spiral spring.

33. The tool according to claim 14, wherein the first holding means are configured to engage the housing outer surface between said second internal projection and a third internal projection for limiting movement of the grip ring in the pipe insertion direction and/or limiting movement of the sealing ring in the pipe removal direction.

34. The tool according to claim 17, wherein the handle comprises a pair of tong grippers, detachably connectable with the first and second holding means via at least one of gripper fingers and a snap connection.

35. The tool according to claim 1, wherein the handle is connected with the second engagement means.

* * * * *

UNITED STATES PATENT AND TRADEMARK OFFICE
CERTIFICATE OF CORRECTION

PATENT NO. : 8,424,179 B2  
APPLICATION NO. : 12/525527  
DATED : April 23, 2013  
INVENTOR(S) : S. P. Webb et al.

Page 1 of 1

It is certified that error appears in the above-identified patent and that said Letters Patent is hereby corrected as shown below:

In the Claims

| COLUMN | LINE | ERROR |
|---|---|---|
| 12 (Claim 3, line 4) | 11 | after "housing" delete --,-- |

Signed and Sealed this  
Twenty-ninth Day of October, 2013

Teresa Stanek Rea  
*Deputy Director of the United States Patent and Trademark Office*